United States Patent [19]
Cleron et al.

[11] Patent Number: 5,907,843
[45] Date of Patent: *May 25, 1999

[54] REPLACEABLE AND EXTENSIBLE NAVIGATOR COMPONENT OF A NETWORK COMPONENT SYSTEM

[75] Inventors: Michael A. Cleron, Menlo Park; Michael M. Nordman, Palo Alto, both of Calif.

[73] Assignee: Apple Computer, Inc., Cupertino, Calif.

[ * ] Notice: This patent is subject to a terminal disclaimer.

[21] Appl. No.: 08/806,483

[22] Filed: Feb. 27, 1997

[51] Int. Cl.⁶ .................................. G06F 17/30
[52] U.S. Cl. ............................ 707/10; 707/103; 707/1; 707/500
[58] Field of Search ...................... 1/1; 707/1, 10, 707/501, 103, 500; 345/328, 335; 364/140.6; 379/93.12, 229; 395/200.3, 200.33, 200.48, 200.59, 500, 735, 682, 200.6

[56] References Cited

U.S. PATENT DOCUMENTS

| | | | |
|---|---|---|---|
| 5,584,035 | 12/1996 | Duggan et al. | 395/800 |
| 5,724,506 | 3/1998 | Cleron | 395/200 |
| 5,732,246 | 3/1998 | Rogers | 707/10 |
| 5,751,961 | 5/1998 | Smyk | 395/200 |
| 5,752,246 | 5/1998 | Rogers | 707/10 |

FOREIGN PATENT DOCUMENTS

WO96/35285  11/1996  European Pat. Off. ........ H04L 29/06

OTHER PUBLICATIONS

Feiler, Jesse, "Cyberdog—The Complete Guide to Apple's Internet Productivity Technology", AP Professional, 1996, U.S.A., pp. iv–xviii, 284–285, 288–289, 296–298, 310–312, 345–347.

Apple Computer, Inc., "Cyberdog Programmer's Kit", Addison–Wesley Publishing Co., 1996, U.S.A., pp. 2–8, 32–33, 45–50, 53–59, 68–83, 241–242, 256–261, and 269–276.

Apple Computer, Inc., "Cyberdog Programmer's Kit", 1996.

MacWeek, Nov. 7, 1994, vol. 8, No. 44, "Cyberdog to Fetch Internet Resources for OpenDocApps", R. Hess.

Opinion, MacWeek, Nov. 14, 1994, The Second Decade, "Cyberdog Could be a Breakthrough it It's Kept on a Leash", H. Norr.

*Primary Examiner*—Thomas G. Black
*Assistant Examiner*—Diane Mizrahi
*Attorney, Agent, or Firm*—Cesari and McKenna, LLP

[57] ABSTRACT

An extensible and replaceable network-oriented component system provides a platform for developing network navigation components that operate on a variety of hardware and software computer systems. These navigation components assist users in navigating from information locations quickly and accurately. Also, these navigation components may be modified or replaced with new navigation components for embedding various types of information therein. Communication among these components is achieved through novel application programming interfaces (APIs) to facilitate integration with an underlying software component architecture. Such a highly-modular cooperating layered-arrangement between the network component system and the component architecture allows any existing component to be replaced, and allows new components to be added, without affecting operation of the network component system.

33 Claims, 10 Drawing Sheets

ABLE AND EXTENSIBLE NAVIGATOR COMPONENT OF A NETWORK COMPONENT SYSTEM

CROSS-REFERENCE TO RELATED APPLICATIONS

This invention is related to the following copending U.S. Patent Applications:

U.S. patent application Ser. No. 08/435,862 now abandoned, titled REPLACEABLE AND EXTENSIBLE LOG COMPONENT OF A NETWORK COMPONENT SYSTEM;

U.S. patent pending application Ser. No. 08/435,377, titled EXTENSIBLE, REPLACEABLE NETWORK COMPONENT SYSTEM;

U.S. Pat. No. 5,784,619 now abandoned, titled REPLACEABLE AND EXTENSIBLE NOTEBOOK COMPONENT OF A NETWORK COMPONENT SYSTEM;

U.S. Pat. No. 5,724,506, titled REPLACEABLE AND EXTENSIBLE CONNECTION DIALOG COMPONENT OF A NETWORK COMPONENT SYSTEM;

U.S. Pat. No. 5,781,189, titled EMBEDDING INTERNET BROWSER/BUTTONS WITHIN COMPONENTS OF A NETWORK COMPONENT SYSTEM;

U.S. patent pending application Ser. No. 08/435,880, titled ENCAPSULATED NETWORK ENTITY REFERENCE OF A NETWORK COMPONENT SYSTEM, each of which was filed on May 5, 1995 and assigned to the assignee of the present invention; and U.S. patent pending application Ser. No. 08/806,484, entitled ASYNCHRONOUS-EVENT OPENING COMPONENT OF A NETWORK COMPONENT SYSTEM, which was filed on Feb. 27, 1997 and assigned to the assignee of the present invention.

FIELD OF THE INVENTION

This invention relates generally to computer networks and, more particularly, to an architecture and tools for building Internet-specific services of a network component based system.

BACKGROUND OF THE INVENTION

The Internet is a system of geographically distributed computer networks interconnected by computers executing networking protocols that allow users to interact and share information over the networks. Because of such wide-spread information sharing, the Internet has generally evolved into an "open" system for which developers can design software for performing specialized operations, or services, essentially without restriction. These services are typically implemented in accordance with a client/server architecture, wherein the clients, e.g., personal computers or workstations, are responsible for interacting with the users and the servers are computers configured to perform the services as directed by the clients.

Not surprisingly, each of the services available over the Internet is generally defined by its own networking protocol. A protocol is a set of rules governing the format and meaning of messages or "packets" exchanged over the networks. By implementing services in accordance with the protocols, computers cooperate to perform various operations, or similar operations in various ways, for users wishing to "interact" with the networks. The services typically range from browsing or searching for information having a particular data format using a particular protocol to actually acquiring information of a different format in accordance with a different protocol.

For example, the file transfer protocol (FTP) service facilitates the transfer and sharing of files across the Internet. The Telnet service allows users to log onto computers coupled to the networks, while the netnews protocol provides a bulletin-board service to its subscribers. Furthermore, the various data formats of the information available on the Internet include JPEG images, MPEG movies and $\mu$-law sound files.

Coincident with the design of these services has been the development of applications for implementing the services on the client/server architecture. Accordingly, applications are available for users to obtain files from computers connected to the Internet using the FTP protocol. Similarly, individual applications allow users to log into remote computers (as though they were logging in from terminals attached to those computers) using the Telnet protocol and, further, to view JPEG images and MPEG movies. As a result, there exists a proliferation of applications directed to user activity on the Internet.

A problem with this vast collection of application-specific protocols is that these applications are generally unorganized, thus requiring users to plod through them in order to satisfyingly, and profitably, utilize the Internet. Such lack of uniformity is time consuming and disorienting to users that want to access particular types of information but are forced to use unfamiliar applications. Because of the enormous amount of different types of information available on the Internet and the variety of applications needed to access those information types, the experience of using the Internet may be burdensome to these users.

An alternative to the assortment of open applications for accessing information on the Internet is a "closed" application system, such as Prodigy, CompuServe or America Online. Each of these systems provide a full range of well-organized services to their subscribers; however, they also impose restrictions on the services developers can offer for their systems. Such constraint of "new" service development may be an unreasonable alternative for many users.

Two fashionable services for accessing information over the Internet are Gopher and the World-Wide Web ("Web"). Gopher consists of a series of Internet servers that provide a "list-oriented" interface to information available on the networks; the information is displayed as menu items in a hierarchical manner. Included in the hierarchy of menus are documents, which can be displayed or saved, and searchable indexes, which allow users to type keywords and perform searches.

Some of the menu items displayed by Gopher are links to information available on other servers located on the networks. In this case, the user is presented with a list of available information documents that can be opened. The opened documents may display additional lists or they may contain various data-types, such as pictures or text; occasionally, the opened documents may "transport" the user to another computer on the Internet.

The other popular information service on the Internet is the Web. Instead of providing a user with a hierarchical list-oriented view of information, the Web provides the user with a "linked-hypertext" view. Metaphorically, the Web perceives the Internet as a vast book of pages, each of which may contain pictures, text, sound, movies or various other types of data in the form of documents. Web documents are written in HyperText Markup Language (HTML) and Web servers transfer HTML documents to each other through the HyperText Transfer Protocol (HTTP).

The Web service is essentially a means for naming sources of information on the Internet. Armed with such a general naming convention that spans the entire network system, developers are able to build information servers that potentially any user can access. Accordingly, Gopher servers, HTTP servers, FTP servers, and E-mail servers have been developed for the Web. Moreover, the naming convention enables users to identify resources (such as directories and documents) on any of these servers connected to the Internet and allow access to those resources.

As an example, a user "traverses" the Web by following hot items of a page displayed on a graphical Web browser. These hot items are hypertext links whose presence are indicated on the page by visual cues, e.g., underlined words, icons or buttons. When a user follows a link (usually by clicking on the cue with a mouse), the browser displays the target pointed to by the link which, in some cases, may be another HTML document.

The Gopher and Web information services represent entirely different approaches to interacting with information on the Internet. One follows a list-approach to information that "looks" like a telephone directory service, while the other assumes a page-approach analogous to a tabloid newspaper. However, both of these approaches include applications for enabling users to browse information available on Internet servers. For example, TurboGopher is a text-based browser application for client computers operating in accordance with the Gopher protocol. Additionally, each of these applications has a unique way of viewing and accessing the information on server computers.

Typically, a computer includes an operating system and application software which, collectively, control the operations of the computer. The applications are preferably task-specific and independent, e.g., a word processor application edits text, a drawing application edits drawings and a database application interacts with information stored on a database storage unit. Although a user can move data from one application to the other, such as by copying a drawing into a word processing file, the independent applications must be invoked to thereafter manipulate that data. This is primarily because the applications are designed as monolithic, autonomous modules that generally do not interact efficiently.

Netscape Navigator™ ("Netscape") is an example of a monolithic Web browser application that is configured to interact with many of the previously-described protocols, including HTTP, Gopher and FTP. However when instructed to invoke an application that uses one of these protocols, Netscape "translates" the protocol to hypertext. Such awkward translation places the user farther away from the protocol designed to run the application and, in some cases, actually thwarts the user's Internet experience. For example, a discussion system requiring an interactive exchange between participants may be bogged down by hypertext translations.

Each of these information services provides a mechanism for keeping track of places explored while navigating the computer networks. For example, Netscape has a log mechanism which typically manifests as a pop-up menu that shows recent places a user has explored. These mechanisms, however, are not generally configured to interact with applications other than their own, primarily due to the monolithic nature of the Netscape and TurboGopher applications. Thus, it is difficult to replace the logs with similar mechanisms provided by other developers; furthermore, the monolithic nature of the applications generally precludes extension of the functions and behaviors of these mechanisms other than by those developers associated with the respective services.

The Gopher and Web services may further require additional applications to perform specific functions, such as playing sound or viewing movies, with respect to the data types contained in the documents. For example, Netscape employs helper applications for executing application programs having data formats it does not "understand". Execution of these functions on a computer requires interruption of processing and context switching (i.e., saving of state) prior to invoking the appropriate application. Thus, if a user operating within the Netscape application "opens" a MPEG movie, that browsing application must be saved (e.g., to disk) prior to opening an appropriate MPEG application, e.g., Sparkle, to view the image. Such an arrangement is inefficient and rather disruptive to processing operations of the computer.

Generally, the application program presents information to a user through a window of a graphical user interface by drawing images, graphics or text within the window region. The user, in turn, communicates with the application by "pointing" at graphical objects in the window with a pointer that is controlled by a hand-operated pointing device, such as a mouse, or by pressing keys of a keyboard.

The graphical objects typically included with each window region are sizing boxes, buttons and scroll bars. These objects represent user interface elements that the user can point at with the pointer (or a cursor) to select or manipulate. For example, the user may manipulate these elements to move the windows around on the display screen, and change their sizes and appearances so as to arrange the window in a convenient manner. When the elements are selected or manipulated, the underlying application program is informed, via the window environment, that control has been appropriated by the user.

A menu bar is a further example of a user interface element that provides a list of menus available to a user. Each menu, in turn, provides a list of command options that can be selected merely by pointing to them with the mouse-controlled pointer. That is, the commands may be issued by actuating the mouse to move the pointer onto or near the command selection, and pressing and quickly releasing, i.e., "clicking" a button on the mouse.

Command options in the menus typically act on one or more objects. If an application requires more information to carry out a command, a dialog box may be employed. A dialog box is a special type of window that elicits information from the user, such as requiring the user to check items or fill in the blanks, typically through the use of a graphical object that the user can manipulate with the mouse. Such an object is called a control and, by manipulating the control, the user can take an immediate action or change a setting to modify a future action. A modal dialog box requires that the user respond to the elicitation prior to performing other actions.

In contrast to this typical application-based computing environment, a software component architecture provides a modular document-based computing arrangement using tools such as viewing editors. The key to document-based computing is the compound document, i.e., a document composed of many different types of data sharing the same file. The types of data contained in a compound document may range from text, tables and graphics to video and sound.

Several editors, each designed to handle a particular data type or format, can work on the contents of the document at the same time, unlike the application-based computing environment.

Since many editors may work together on the same document, the compound document is apportioned into individual modules of content for manipulation by the editors. The compound-nature of the document is realized by embedding these modules within each other to create a document having a mixture of data types. The software component architecture provides the foundation for assembling documents of differing contents and the present invention is directed to a system for extending this capability to network-oriented services.

Therefore, it is among the objects of the present invention to simplify a user's experience on computer networks without sacrificing the flexibility afforded the user by employing existing protocols and data types available on those networks.

Another object of the invention is to provide a document-based computing system that enables users to replace and extend modules configured to provide services directed to information available on computer networks.

Still another object of the invention is to provide a framework that allows third-party developers to extend a layered network component system by building new components that seamlessly interact with the system components.

SUMMARY OF THE INVENTION

Briefly, the invention comprises extensible and replaceable network-oriented component system that provides a framework for developing network navigator parts that operate on a variety of hardware and software computer systems. These navigator parts include key integrating components along with components, such as Gopher-specific and Web-specific components, configured to deliver conventional services directed to computer networks. Communication among these components is achieved through novel application programming interfaces (APIs) to facilitate integration with an underlying software component architecture. Such a highly-modular cooperating layered-arrangement between the network component system and the component architecture allows any existing component to be replaced, and allows new components to be added, without affecting operation of the novel network component system.

According to one aspect of the present invention, the novel system provides a navigator part for linking between information available on the computer networks. More specifically, the navigator part assists the ability and ease of the user to browse the Internet by moving from one location to another in a small number of windows. The information may include various data types available from a variety of sources coupled to the computer networks. Various kinds of information may be embedded in the navigator part and because the navigator part can be modified or have new components added thereto, the information may be presented regardless of its source. Additional components and component display parts embedded in the navigator part may be created in connection with the underlying software component architecture to allow integration of different data types and protocols needed to interact with information on the Internet.

In accordance with another aspect of the invention, the navigator part provides an iconic representation of the contents that is being displayed. This allows the contents to be simply dragged and stored all together for later use. For instance, the icon representation for the displayed contents may be dragged into a notebook (a place for storing information by referring to network locations) so that the contents may be later retrieved from the notebook by clicking on the icon representation of the contents.

In accordance with another aspect of the invention, the component system is preferably embodied as a customized framework having a set of interconnected abstract classes for defining network-oriented objects. These abstract classes include CyberItem, CyberStream and CyberExtension, and the objects they define are used to build the novel navigator parts. Interactions among these latter components and existing components of the underlying software architecture provide the basis for the extensibility and replaceability features of the network component system.

Specifically, CyberItem is an object abstraction which represents a "resource on a computer network", but which may be further expanded to include resources available at any accessible location. CyberStream is an object abstraction representing a method for downloading information from a remote location on the computer network, while CyberExtension represents additional behaviors provided to the existing components for integration with the network component system.

The novel network system captures the essence of a "component-based" approach to navigating and linking between network-oriented information as opposed to the monolithic application-based approach of prior navigating systems. Such a component-based system has a number of advantages. First, if a user does not like the way a particular component operates, that component can be replaced with a different component provided by another developer. In contrast, if a user does not like the way a monolithic application handles certain protocols, the only recourse is to use another service because the user cannot modify the application to perform the protocol functions in a different manner. Clearly, the replaceability feature of the novel network component system provides a flexible alternative to the user.

Second, the use of components is substantially less disruptive than using helper applications in situations where a monolithic application confronts differing data types and formats. Instead of "switching" application layers, the novel network system merely invokes the appropriate component and component display part configured to operate with the data type and format. Such "seamless" integration among components is a significant feature of the modular cooperating architecture described herein.

A third advantage of the novel network system is directed to the cooperating relationship between the system and the underlying software component architecture. Specifically, the novel network components are based on the component architecture technology to therefore ensure cooperation between all components in an integrated manner. The software component architecture is configured to operate on a plurality of computers, and is preferably implemented as a software layer adjoining the operating system.

BRIEF DESCRIPTION OF THE DRAWINGS

The above and further advantages of the invention may be better understood by referring to the following description in conjunction with the accompanying drawings in which.

DETAILED DESCRIPTION OF ILLUSTRATIVE EMBODIMENT

Figure 1:
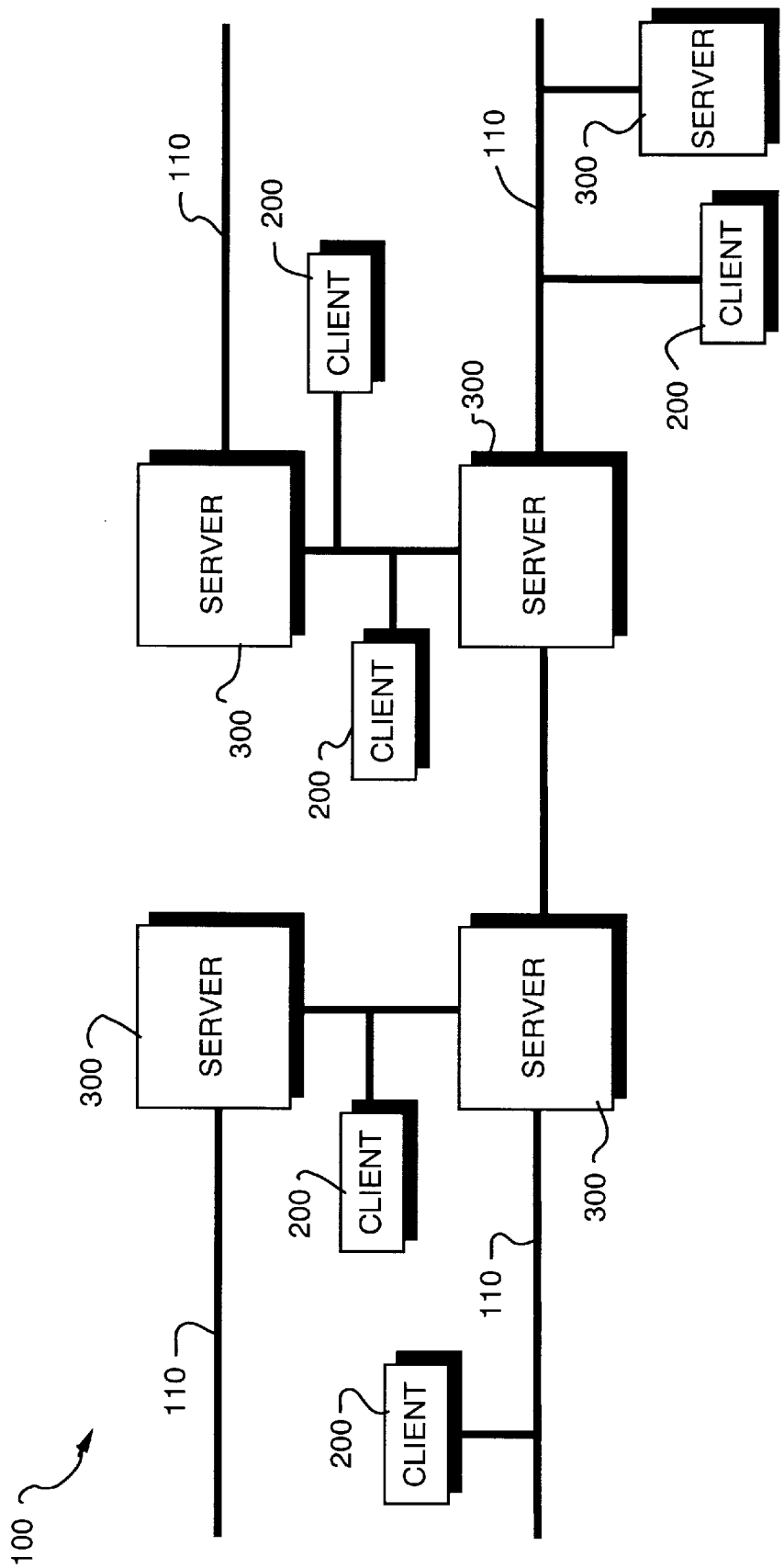
FIG. 1 is a block diagram of a network system including a collection of computer networks interconnected by client and server computers.

FIG. 1 is a block diagram of a network system 100 comprising a collection of computer networks 110 interconnected by client computers ("clients") 200, e.g., workstations or personal computers, and server computers ("servers") 300. The servers are typically computers having hardware and software elements that provide resources or services for use by the clients 200 to increase the efficiency of their operations. It will be understood to those skilled in the art that, in an alternate embodiment, the client and server may exist on the same computer; however, for the illustrative embodiment described herein, the client and server are separate computers.

Several types of computer networks 110, including local area networks (LANs) and wide area networks (WANs), may be employed in the system 100. A LAN is a limited area network that typically consists of a transmission medium, such as coaxial cable or twisted pair, while a WAN may be a public or private telecommunications facility that interconnects computers widely dispersed. In the illustrative embodiment, the network system 100 is the Internet system of geographically distributed computer networks.

Computers coupled to the Internet typically communicate by exchanging discrete packets of information according to predefined networking protocols. Execution of these networking protocols allow users to interact and share information across the networks. As an illustration, in response to a user's request for a particular service, the client 200 sends an appropriate information packet to the server 300, which performs the service and returns a result back to the client 200.

Figure 2:
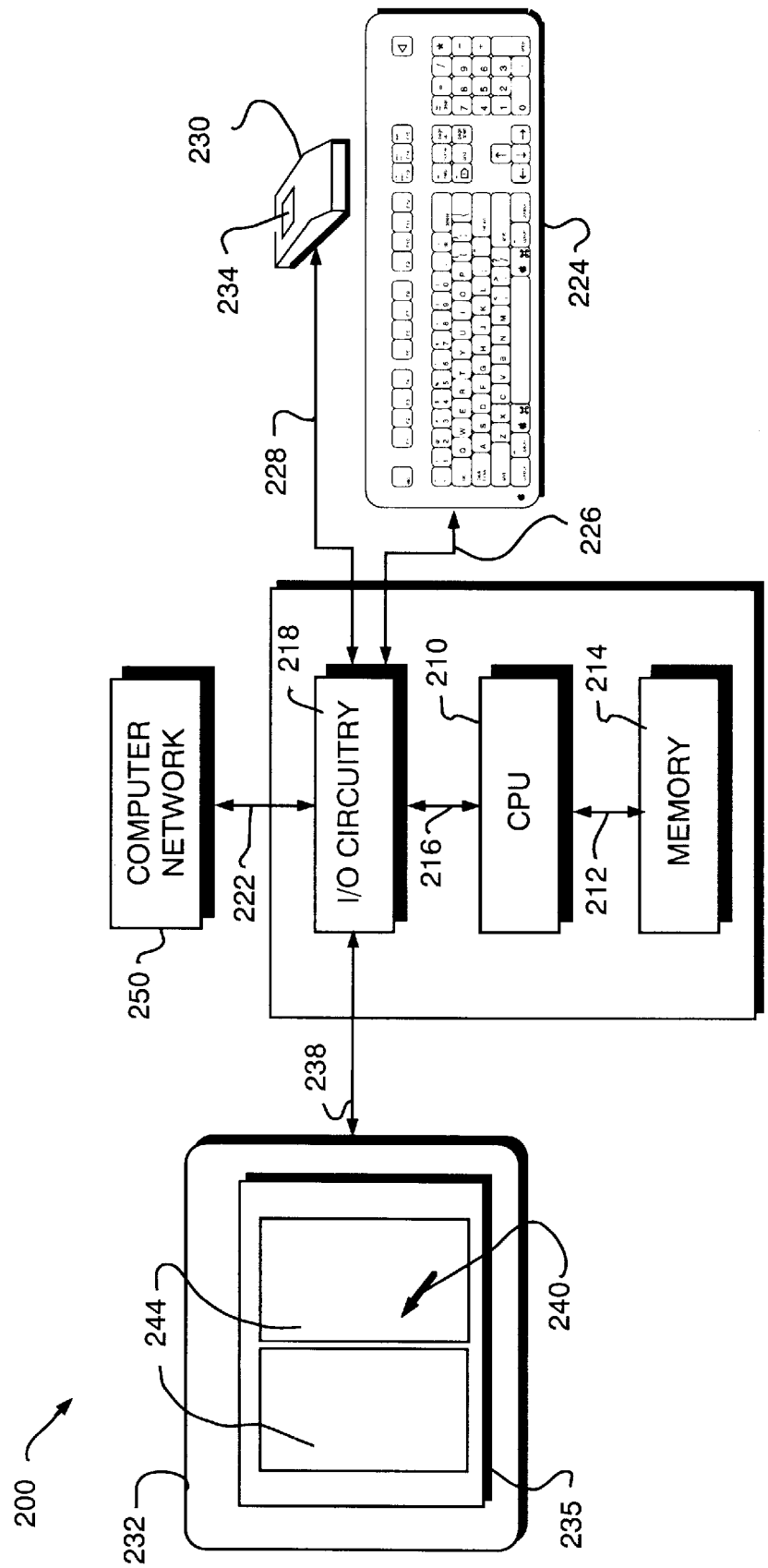
FIG. 2 is a block diagram of a client computer, such as a personal computer, on which the invention may advantageously operate.

FIG. 2 illustrates a typical hardware configuration of a client 200 comprising a central processing unit (CPU) 210 coupled between a memory 214 and input/output (I/O) circuitry 218 by bi-directional buses 212 and 216. The memory 214 typically comprises random access memory (RAM) for temporary storage of information and read only memory (ROM) for permanent storage of the computer's configuration and basic operating commands, such as portions of an operating system (not shown). As described further herein, the operating system controls the operations of the CPU 210 and client computer 200.

The I/O circuitry 218, in turn, connects the computer to computer networks, such as the Internet computer networks 250, via a bi-directional bus 222 and to cursor/pointer control devices, such as a keyboard 224 (via cable 226) and a mouse 230 (via cable 228). The mouse 230 typically contains at least one button 234 operated by a user of the computer. A conventional display monitor 232 having a display screen 235 is also connected to I/O circuitry 218 via cable 238. A pointer (cursor) 240 is displayed on windows 244 of the screen 235 and its position is controllable via the mouse 230 or the keyboard 224, as is well-known. Typically, the I/O circuitry 218 receives information, such as control and data signals, from the mouse 230 and keyboard 224, and provides that information to the CPU 210 for display on the screen 235 or, as described further herein, for transfer over the Internet computer networks 250.

Figure 3:
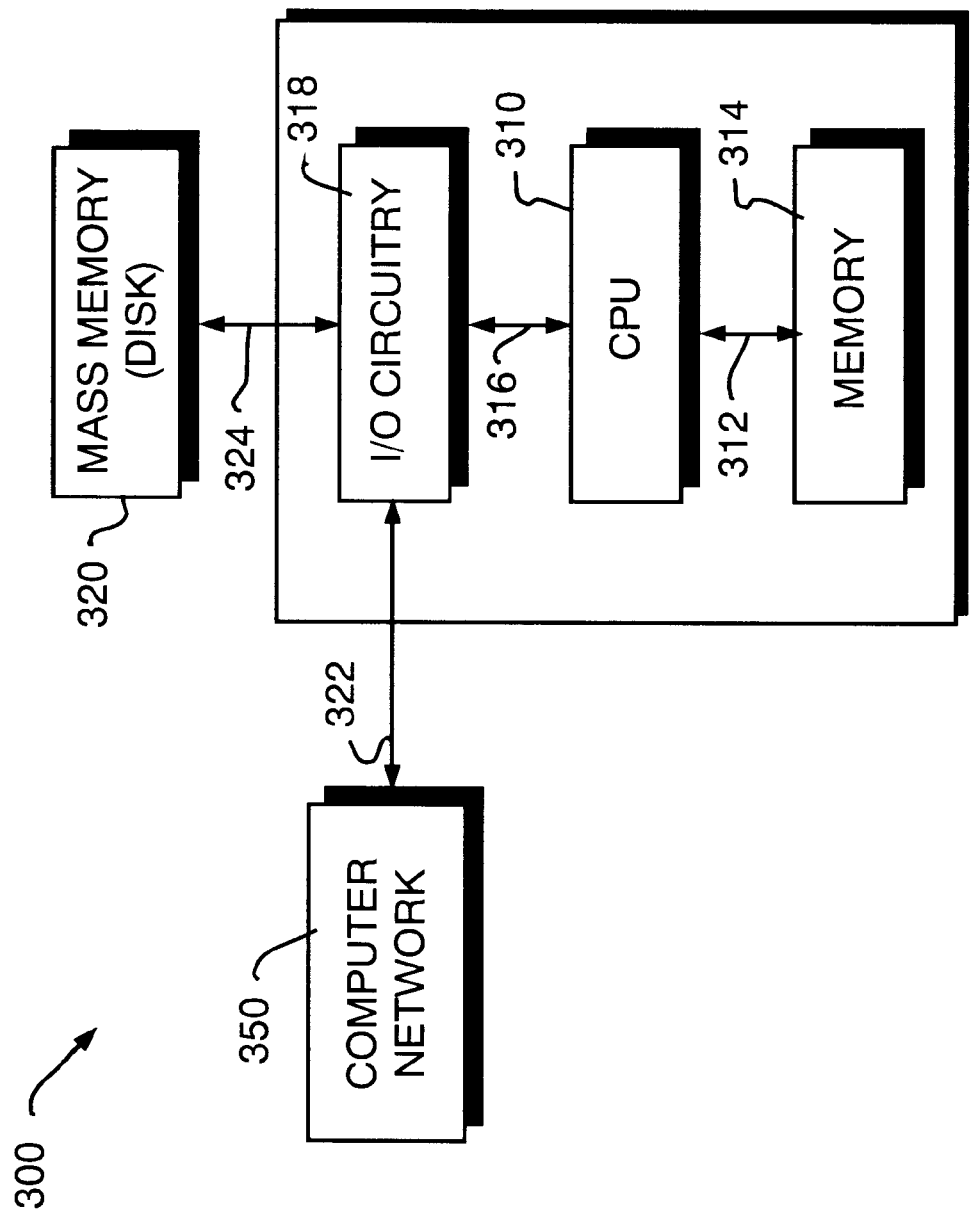
FIG. 3 is a block diagram of a server computer of FIG. 1.

FIG. 3 illustrates a typical hardware configuration of a server 300 of the network system 100. The server 300 has many of the same units as employed in the client 200, including a CPU 310, a memory 314, and I/O circuitry 318, each of which are interconnected by bi-directional buses 312 and 316. Also, the I/O circuitry 318 connects the computer to computer networks 350 via a bidirectional bus 322. These units are configured to perform functions similar to those provided by their corresponding units in the computer 200. In addition, the server typically includes a mass storage unit 320, such as a disk drive, connected to the I/O circuitry 318 via bi-directional bus 324.

It is to be understood that the I/O circuits within the computers 200 and 300 contain the necessary hardware, e.g., buffers and adapters, needed to interface with the control devices, the display monitor, the mass storage unit and the networks. Moreover, the operating system includes the necessary software drivers to control, e.g., network adapters within the I/O circuits when performing I/O operations, such as the transfer of data packets between the client 200 and server 300.

The computers are preferably personal computers of the Macintosh® series of computers sold by Apple Computer Inc., although the invention may also be practiced in the context of other types of computers, including the IBM® series of computers sold by International Business Machines Corp. These computers have resident thereon, and are controlled and coordinated by, operating system software, such as the Apple® System 7®, IBM OS2®, or the Microsoft® Windows® operating systems.

Figure 4:
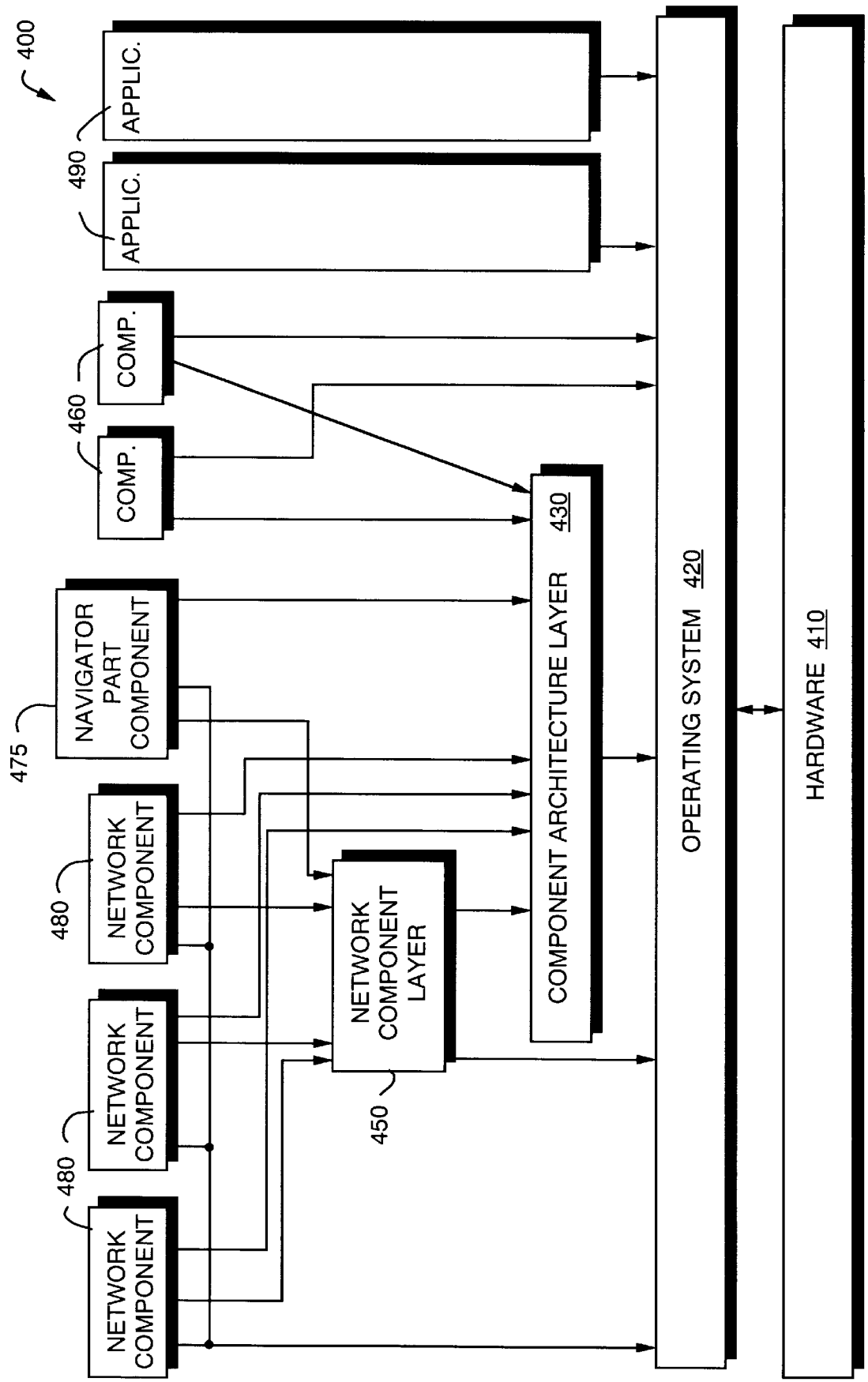
FIG. 4 is a highly schematized block diagram of a layered component computing arrangement in accordance with the invention.

As noted, the present invention is based on a modular document computing arrangement as provided by an underlying software component architecture, rather than the typical application-based environment of prior computing systems. FIG. 4 is a highly schematized diagram of the hardware and software elements of a layered component computing arrangement 400 that includes the novel network-oriented component system of the invention. At the lowest level there is the computer hardware, shown as layer 410. Interfacing with the hardware is a conventional operating system layer 420 that includes a window manager, a graphic system, a file system and network-specific interfacing, such as a TCP/IP protocol stack and an Appletalk protocol stack.

The software component architecture is preferably implemented as a component architecture layer 430. Although it is shown as overlaying the operating system 420, the component architecture layer 430 is actually independent of the operating system 420 and, more precisely, resides side-by-side with the operating system 420. This relationship allows the component architecture to exist on multiple platforms that employ different operating systems.

In accordance with the present invention, a novel network-oriented component layer 450 contains the underlying technology for implementing the extensible and replaceable network component system having a navigator part component 475 that assists a user in navigating from location to location quickly and accurately on computer networks, such as the Internet. As described further herein, this technology includes novel application programming interfaces (API) that facilitates integration with the underlying component architecture layer 430 and allows the navigator part component 475 to be replaced, extended or modified by other navigator-type components. The novel API is preferably delivered in the form of objects in a class hierarchy.

It should be noted that the network component layer 450 may operate with any existing system-wide component architecture, such as the Object Linking and Embedding (OLE) architecture developed by the Microsoft Corporation; however, in the illustrative embodiment, the component architecture is preferably OpenDoc, the vendor-neutral, open standard for facilitating the construction and sharing of compound documents developed by, among others, Apple Computer, Inc.

Using tools such as viewing editors, the component architecture layer 430 creates a compound document composed of data having different types and formats. Each differing data type and format is contained in a fundamental unit called a computing part or, more generally, a "component" 460 comprised of a viewing editor along with the data content. An example of the computing component 460 may include a MacDraw component. The component editor, on the other hand, is analogous to an application program in a conventional computer. That is, the editor is a software component which provides the necessary functionality to display a component's contents and, where appropriate, present a user interface for modifying those contents. Additionally, the editor may include menus, controls and other user interface elements.

The network component layer 450 extends the functionality of the underlying component architecture layer 430 by defining key integrating network-oriented components 480, such as the navigator part component 475. As noted, a feature of the invention is the ability to easily extend, replace or modify the navigator part component 475 of the layered computing arrangement 400 with a different navigator-type component to provide a user with a customized network-related service offering. This feature is made possible by the cooperating relationship between the network component layer 450 and its underlying component architecture layer 430. For example, the components may include FTP-specific components for transferring files across the networks, Telnet-specific components for remotely logging onto other computers, and JPEG-specific and MPEG-specific components for viewing image and movie data types and formats. The integrating components communicate and interact with these various components of the system in a "seamlessly integrated" manner to provide basic tools for navigating the Internet computer networks.

FIG. 4 also illustrates the relationship of applications 490 to the elements of the layered computing arrangement 400. Although they reside in the same "user space" as the components 460 and network components 480, the applications 490 do not interact with these elements and, thus, interface directly to the operating system layer 420. Because they are designed as monolithic, autonomous modules, applications (such as previous Internet browsers) often do not even interact among themselves. In contrast, the components of the arrangement 400 are designed to work together via the common component architecture layer 430 or, in the case of the network components, via the novel network component layer 450.

Specifically, the invention features the provision of the extensible and replaceable network-oriented component system which, when invoked, causes actions to take place that enhance the ability of a user to interact with the computer to obtain information available over computer networks such as the Internet. The information is manifested to a user via a window environment, such as the graphical user interface provided by System 7 or Windows, that is preferably displayed on the screen 235 (FIG. 2) as a graphical display to facilitate interactions between the user and the computer, such as the client 200. This behavior of the system is brought about by the interaction of the network components with a series of system software routines associated with the operating system 420. These system routines, in turn, interact with the component architecture layer 430 to create the windows and graphical user interface elements, as described further herein.

The window environment is generally part of the operating system software that includes a collection of utility programs for controlling the operation of the computer 200. The operating system 420, in turn, interacts with the components to provide higher level functionality, including a direct interface with the user. A component makes use of operating system functions by issuing a series of task commands to the operating system via the network component layer 450 or, as is typically the case, through the component architecture layer 430. The operating system 420 then performs the requested task. For example, the component may request that a software driver of the operating system initiate transfer of a data packet over the networks 250 or that the operating system display certain information on a window for presentation to the user.

Figure 5:
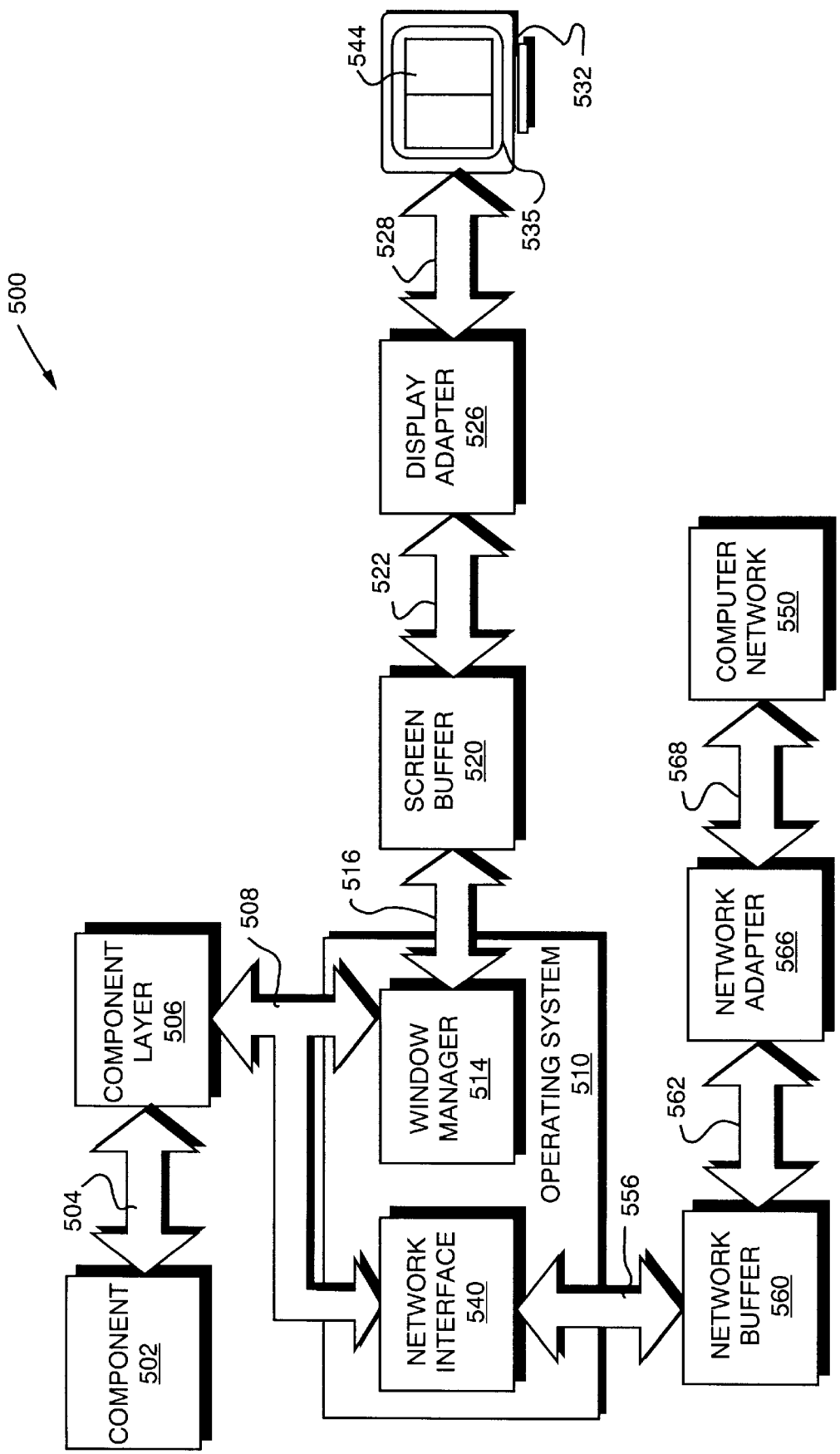
FIG. 5 is a schematic illustration of the interaction of a component, a software component layer and an operating system of the computer of FIG. 2.

FIG. 5 is a schematic illustration of the interaction of a component 502, software component layer 506 and an operating system 510 of a computer 500, which is similar to, and has equivalent elements of, the client computer 200 of FIG. 2. As noted, the network component layer 450 (FIG. 4) is integrated with the component architecture layer 430 to provide a cooperating architecture that allows the novel navigator part component 475 to be replaced, extended or modified by other navigator-type components; accordingly, for purposes of the present discussion, the layers 430 and 450 may be treated as a single software component layer 506.

The component 502, component layer 506 and operating system 510 interact to control and coordinate the operations of the computer 500 and their interaction is illustrated schematically by arrows 504 and 508. In order to display information on a screen display 535, the component 502 and component layer 506 cooperate to generate and send display commands to a window manager 514 of the operating system 510. The window manager 514 stores information directly (via arrow 516) into a screen buffer 520.

The window manager 514 is a system software routine that is generally responsible for managing windows 544 that the user views during operation of the network component system. That is, it is generally the task of the window manager to keep track of the location and size of the window and window areas which must be drawn and redrawn in connection with the network component system of the present invention.

Under control of various hardware and software in the system, the contents of the screen buffer 520 are read out of the buffer and provided, as indicated schematically by arrow 522, to a display adapter 526. The display adapter 526 contains hardware and software (sometimes in the form of firmware) which converts the information in the screen buffer 520 to a form which can be used to drive a display screen 535 of a monitor 532. The monitor 532 is connected to display adapter 526 by cable 528.

Similarly, in order to transfer information as a packet over the computer networks, the component 502 and component layer 506 cooperate to generate and send network commands, such as remote procedure calls, to a network-specific interface 540 of the operating system 510. The network interface comprises system software routines, such as "stub" procedure software and protocol stacks, that are generally responsible for formatting the information into a predetermined packet format according to the specific network protocol used, e.g., TCP/IP or Apple-talk protocol.

Specifically, the network interface 540 stores the packet directly (via arrow 556) into a network buffer 560. Under control of the hardware and software in the system, the contents of the network buffer 560 are provided, as indicated schematically by arrow 562, to a network adapter 566. The network adapter incorporates the software and hardware, i.e., electrical and mechanical interchange circuits and characteristics, needed to interface with the particular computer networks 550. The adapter 566 is connected to the computer networks 550 by cable 568.

In a preferred embodiment, the invention described herein is implemented in an object-oriented programming (OOP) language, such as C++, using System Object Model (SOM) technology and OOP techniques. The C++ and SOM languages are well-known and many articles and texts are available which describe the languages in detail. In addition, C++ and SOM compilers are commercially available from several vendors. Accordingly, for reasons of clarity, the details of the C++ and SOM languages and the operations of their compilers will not be discussed further in detail herein.

As will be understood by those skilled in the art, OOP techniques involve the definition, creation, use and destruction of "objects". These objects are software entities comprising data elements and routines, or functions, which manipulate the data elements. The data and related functions are treated by the software as an entity that can be created, used and deleted as if it were a single item. Together, the data and functions enable objects to model virtually any real-world entity in terms of its characteristics, which can be represented by the data elements, and its behavior, which can be represented by its data manipulation functions. In this way, objects can model concrete things like computers, while also modeling abstract concepts like numbers or geometrical designs.

Objects are defined by creating "classes" which are not objects themselves, but which act as templates that instruct the compiler how to construct an actual object. A class may, for example, specify the number and type of data variables and the steps involved in the functions which manipulate the data. An object is actually created in the program by means of a special function called a "constructor" which uses the corresponding class definition and additional information, such as arguments provided during object creation, to construct the object. Likewise objects are destroyed by a special function called a "destructor". Objects may be used by manipulating their data and invoking their functions.

The principle benefits of OOP techniques arise out of three basic principles: encapsulation, polymorphism and inheritance. Specifically, objects can be designed to hide, or encapsulate, all, or a portion of, its internal data structure and internal functions. More specifically, during program design, a program developer can define objects in which all or some of the data variables and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions that have the same overall format, but that work with different data, to function differently in order to produce consistent results. Inheritance, on the other hand, allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 6:
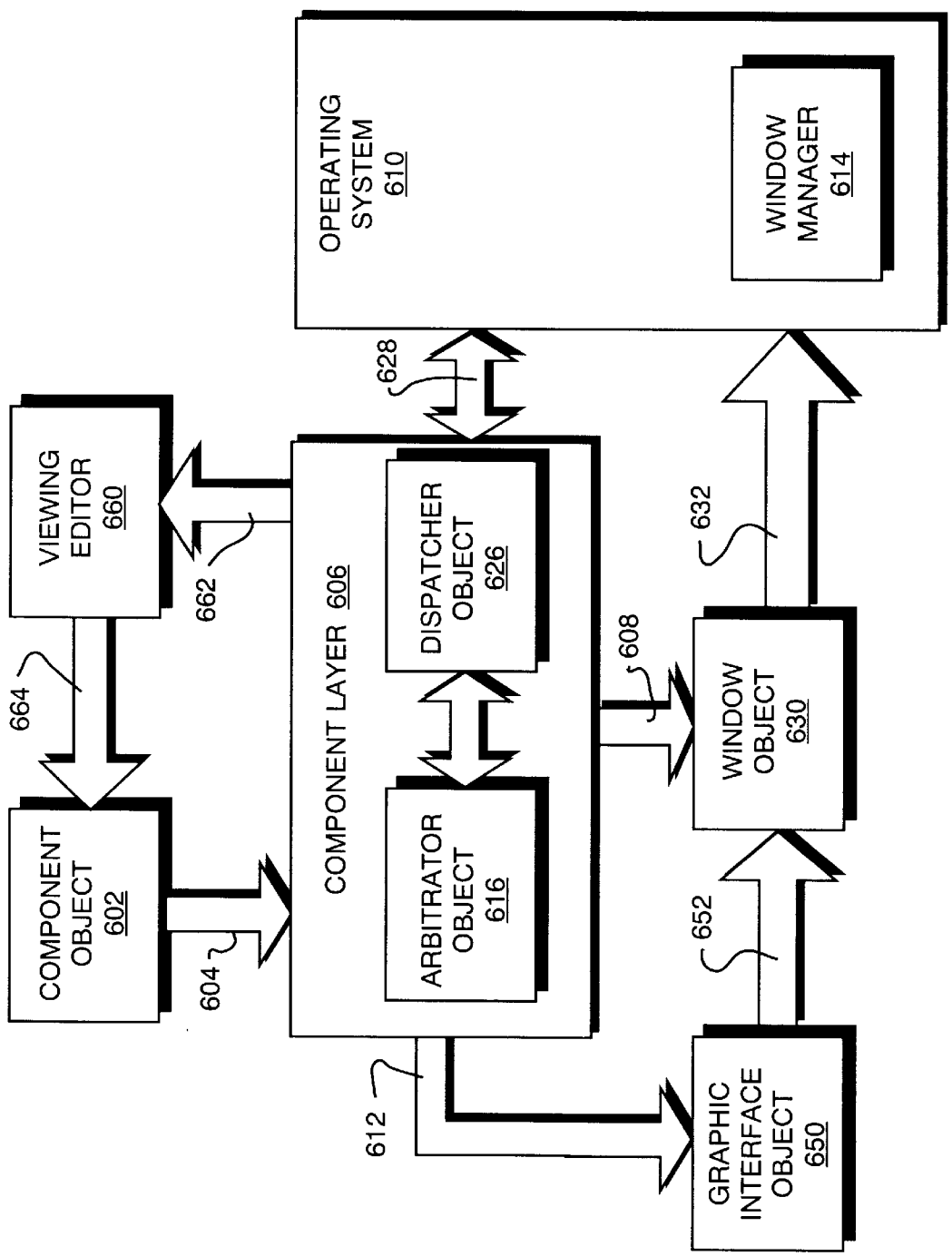
FIG. 6 is a schematic illustration of the interaction between a component, a component layer and a window manager in accordance with the invention.

In accordance with the present invention, the component 502 and windows 544 are "objects" created by the component layer 506 and the window manager 514, respectively, the latter of which may be an object-oriented program. Interaction between a component, component layer and a window manager is illustrated in greater detail in FIG. 6.

In general, the component layer 606 interfaces with the window manager 614 by creating and manipulating objects. The window manager 614 itself may be an object which is created when the operating system 610 is started. Specifically, the component layer 606 creates window objects 630 that cause the window manager 614 to create associated windows on the display screen. This is shown schematically by an arrow 608. In addition, the component layer 606 creates individual graphic interface objects 650 that are stored in each window object 630, as shown schematically by arrows 612 and 652. Since many graphic interface objects may be created in order to display many interface elements on the display screen, the window object 630 communicates with the window manager 614 by means of a sequence of drawing commands issued from the window object 630 to the window manager 614, as illustrated by arrow 632.

As noted, the component layer 606 functions to embed components within one another to form a compound document having mixed data types and formats. Many different viewing editors may work together to display, or modify, the data contents of the document. In order to direct keystrokes and mouse events initiated by a user to the proper components and editors, the component layer 606 includes an arbitrator 616 and a dispatcher 626.

The dispatcher 626 is an object that communicates with the operating system 610 to identify the correct viewing editor 660, while the arbitrator 616 is an object that informs the dispatcher as to which editor "owns" the stream of keystrokes or mouse events. Specifically, the dispatcher 626 receives these "human-interface" events from the operating system 610 (as shown schematically by arrow 628), and delivers them to the correct viewing editor 660 via arrow 662. The viewing editor 660 then modifies or displays, either visually or acoustically, the contents of the data types.

Although OOP offers significant improvements over other programming concepts, software development still requires significant outlays of time and effort, especially if no pre-existing software is available for modification. Consequently, a prior art approach has been to provide a developer with a set of predefined, interconnected classes which create a set of objects and additional miscellaneous routines that are all directed to performing commonly-encountered tasks in a particular environment. Such pre-defined classes and libraries are typically called "frameworks" and essentially provide a pre-fabricated structure for a working document.

For example, a framework for a user interface might provide a set of predefined graphic interface objects which create windows, scroll bars, menus, etc. and provide the support and "default" behavior for these interface objects. Since frameworks are based on object-oriented techniques, the predefined classes can be used as base classes and the built-in default behavior can be inherited by developer-defined subclasses and either modified or overridden to allow developers to extend the framework and create customized solutions in a particular area of expertise. This object-oriented approach provides a major advantage over traditional programming since the programmer is not changing the original program, but rather extending the capabilities of that original program. In addition, developers are not blindly working through layers of code because the framework provides architectural guidance and modeling and, at the same time, frees the developers to supply specific actions unique to the problem domain.

There are many kinds of frameworks available, depending on the level of the system involved and the kind of problem to be solved. The types of frameworks range from high-level frameworks that assist in developing a user interface, to lower-level frameworks that provide basic system software services such as communications, printing, file systems support, graphics, etc. Commercial examples of application-type frameworks include MacApp (Apple), Bedrock (Symantec), OWL (Borland), NeXT Step App Kit (NeXT) and Smalltalk-80 MVC (ParcPlace).

While the framework approach utilizes all the principles of encapsulation, polymorphism, and inheritance in the object layer, and is a substantial improvement over other programming techniques, there are difficulties which arise. These difficulties are caused by the fact that it is easy for developers to reuse their own objects, but it is difficult for the developers to use objects generated by other programs. Further, frameworks generally consist of one or more object "layers" on top of a monolithic operating system and even with the flexibility of the object layer, it is still often necessary to directly interact with the underlying system by means of awkward procedure calls.

In the same way that a framework provides the developer with prefab functionality for a document, a system framework, such as that included in the preferred embodiment, can provide a prefab functionality for system level services which developers can modify or override to create customized solutions, thereby avoiding the awkward procedural calls necessary with the prior art frameworks. For example, consider a customizable network interface framework which can provide the foundation for navigating between information locations over a computer network. A software developer who needed these capabilities would ordinarily have to write specific routines to provide them. To do this with a framework, the developer only needs to supply the characteristic and behavior of the finished output, while the framework provides the actual routines which perform the tasks.

A preferred embodiment takes the concept of frameworks and applies it throughout the entire system, including the document, component, component layer and the operating system. For the commercial or corporate developer, systems integrator, or OEM, this means all of the advantages that have been illustrated for a framework, such as MacApp, can be leveraged not only at the application level for things such as text and graphical user interfaces, but also at the system level for such services as printing, graphics, multi-media, file systems and, as described herein, network-specific operations.

Referring again to FIG. 6, the window object 630 and the graphic interface object 650 are elements of a graphical user interface of a network component system having a customizable framework for greatly enhancing the ability of a user to navigate between information locations over a computer network. The novel network system provides a platform for developing navigator part components for operation on a variety of hardware and software computer systems.

The navigator part is further implemented as a component of the network-oriented component system that, according to the principles of the invention, is extensible and replaceable in accordance with a cooperating relationship between the system and the underlying software component architecture. Specifically, this cooperating relationship allows the novel navigator part to be replaced, extended or modified by other navigator-type components. In addition, such a highly-modular cooperating layered-arrangement between the system and component architecture ensures that these components "seamlessly" interact with existing components and component editors of the system.

Moreover, the network components are preferably implemented as objects and communication among the network component objects is effected through novel application programming interfaces (APIs). These APIs are preferably delivered in the form of objects in a class hierarchy that is extensible so that developers can create new components and editors. From an implementation viewpoint, the objects can be subclassed and can inherit from base classes to build customized components allow users to see different kinds of data using different kinds of protocols, or to create components that function differently from existing components.

In accordance with the invention, the customized framework has a set of interconnected abstract classes for defining network-oriented navigation objects used to build the customized network components. These abstract classes include CyberItem, CyberStream and CyberExtension and the objects they define are used to build the novel network components. A description of these abstract classes is provided in copending and commonly assigned now abandoned U.S. patent application Ser. No. 08/435,377; titled Extensible, Replaceable Network Component System, filed May 5, 1995, which application is incorporated by reference as though fully set forth herein. Specifically, the CyberItem class defines the item object which interacts with objects defined by the other abstract classes of the network system to efficiently "transport" a user back to a desired network location in response to manipulation of the item object's icon.

The navigator part in accordance with the invention can be generalized as a part that assists a user in quickly and accurately navigating or browsing between information locations available on computer networks. The browsing style, which determines the replacement of the information being displayed with new information, is assisted by the navigator part. It should be further noted that the navigator part is an atypical type of CyberPart class. Generally, CyberParts are either "browsers" or "data viewers". However, the navigator part performs neither of these functions. The main function of the navigator part is to embed other parts that show the contents of CyberItems, and keep track of the sequence of CyberItems that are visited within a single navigator part. In a preferred embodiment of the invention, the navigator is an OpenDoc container part, extended with a subclass of a CyberNavigatorExtension class, that embeds display parts.

A display part may choose to display itself in its own window or embedded in the navigator part. By convention, display parts whose content includes links to other content are usually displayed embedded in a navigator part. In a preferred embodiment, the FTP, Gopher, and Web display parts are embedded in the navigator part. A user may control whether the same window for the navigator part should be used for all display parts that are opened or whether a new window for the navigator part should be opened for each new display part that is opened.

Figure 7:
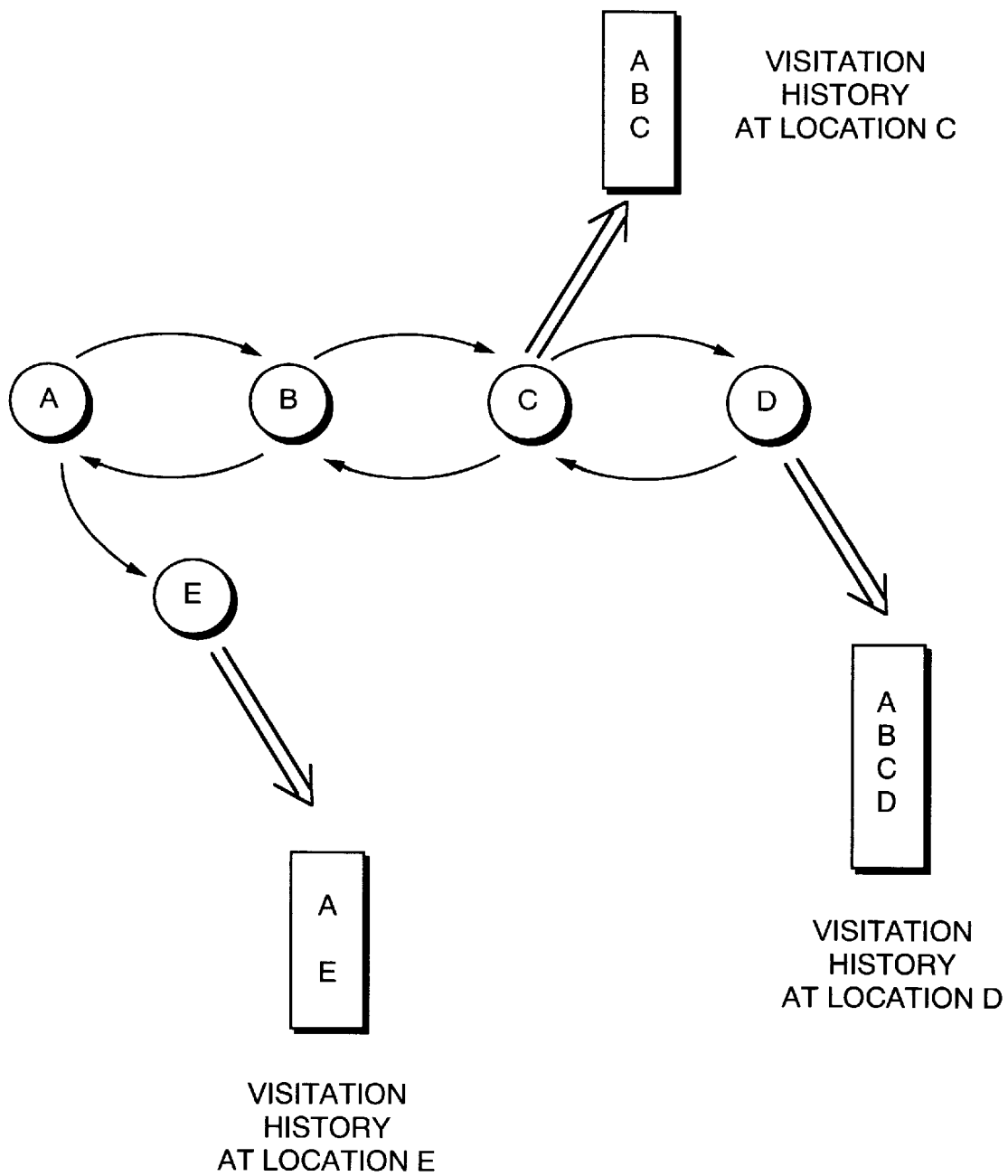
FIG. 7 illustrates a visitation history for exemplary location paths in accordance with the present invention.

Another important function of the navigator part is maintaining a visitation history, which is a collection of CyberItems visited by the navigator part during a session. When a user visits an Internet location using the navigator part, the CyberItem that references the location and the associated display part are added to the visitation history. The visitation history provided by the navigator part shows the actual page and maintains a "local history". This local history is not an exhaustive list of everywhere the user has been. For example, consider the case where a user moves from locations A to B to C to D and then back from D to C to B to A before moving onto E as illustrated in FIG. 7. In this example, the visitation history when the users is at location D includes locations A, B, C, and D. However, when the user is at location E, the visitation history includes only A and E. In other words, the local history shows the path from where the user started to where the user is but the visitation history does not keep track of any place that the user went to, once the user goes on a different path.

It should be noted that the visitation history provides different information than the log component described in copending and commonly assigned now abandoned U.S. patent application Ser. No. 08/435,862; titled Replaceable and Extensible Log Component of a Network Component System filed May 5, 1995. The log component provides the URL or the CyberItem for a certain number of locations that a user has visited. The log component only keeps track of the URLs or CyberItems that have been visited up to this specified number of locations. Every location that the user visits is recorded by the log component regardless of the navigator part used to go to that location. In contrast, the novel navigation part keeps track of the locations that the user has visited with that particular navigation part and the visitation history is local to each individual navigation part.

Figure 8A:
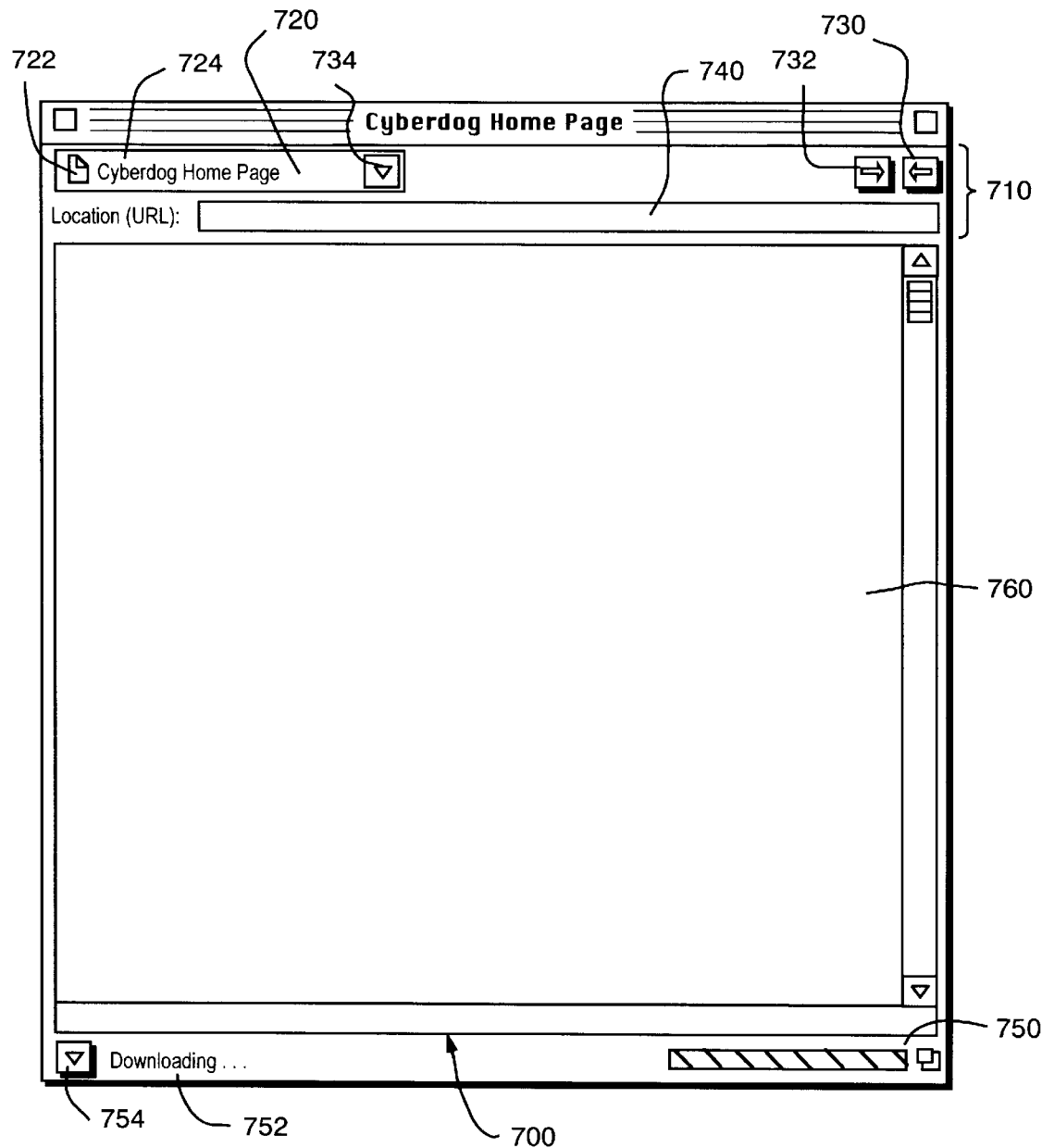
FIGS. 8(A) and 8(B) illustrate exemplary displays of windows and their associated functionality controls for a navigator part in accordance with the invention.

FIG. 8(A) illustrates an example of a window display utilizing a novel navigator part in accordance with the invention. The navigator display part 700 comprises the area that borders an HTML display part 760. The navigator display part 700 includes a control banner 710 having a navigator window 720, control buttons 730, 732 and 734 and a location banner 740. The control banner 710 provides a user interface that allows the user to view a list of the items in the visitation history, to move from item to item in the visitation history, and to revisit an item in the visitation history. The navigator window 720 includes both an icon 722 and a text display 724 associated with the page of information being currently displayed by the navigator part. The icon 722 is a useful representation of the page because it can be conveniently dragged and dropped into a notebook for storage and later use. The control buttons include a forward control button 730, and a backward control button 732 so that pages in the visitation history can be moved back and forth one page at a time for display.

Further included in the navigator display part 700 is a pop up menu control button 734 which provides the entire display of the visitation history when selected. The Pop up menu is useful for instances where the user moves many locations away from a location and wants to return back to that particular location. Rather than clicking the backward control button 732 repeatedly to return to the particular location, the location can be simply selected from the pop up menu display. The location banner 740 displays the URL of the CyberItem. The location banner 740 is an editable text field for specifying any URL.

The navigator display part 700 additionally includes a status and progress banner 750, a process display 752 and a stop button 754. If the size of the CyberItem is not known, a "barber pole" type of display will be provided by the status and progress banner 750 that spins to show that progress is being made with respect to the current process. However, if the size of the CyberItem is known, a thermometer-type display will be provided by the status and progress banner 750 indicating more accurately the status and progress of the current process towards completion. The process display 752 provides a display indicating the process being performed. The stop button 754 is used to stop the process if desired. For instance, the stop button 754 may be used to stop a downloading process that is taking too long.

Figure 8B:
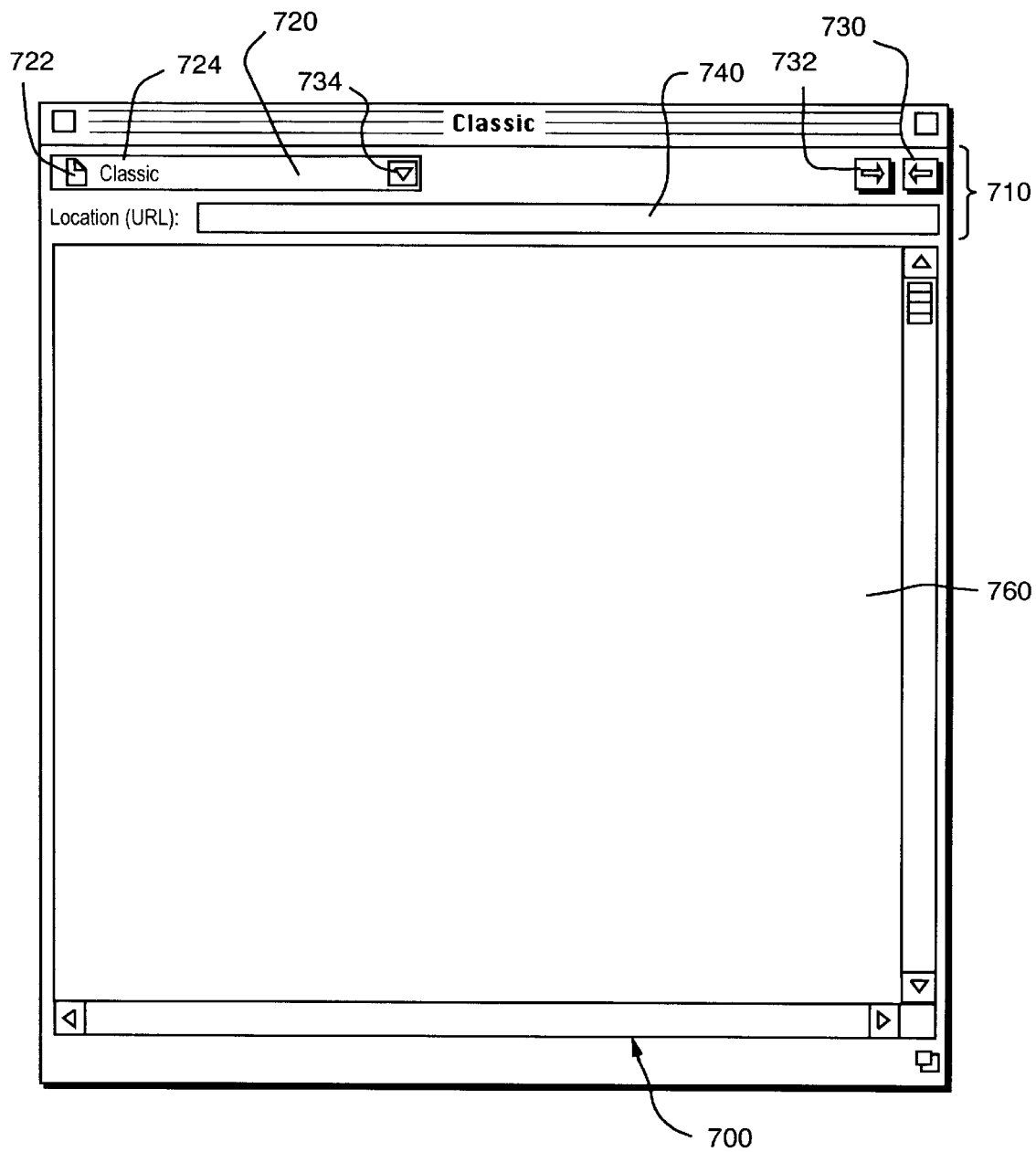

FIG. 8(B) illustrates an example of the navigator display part after a process has been completed. When a process has been completed and a page of information is being displayed, the status and progress banner 750, the process display 752 and the stop button 754 are eliminated from the display because they no longer provide any useful information. However, once another process is initiated, these displays and functions will be provided.

Figure 9:
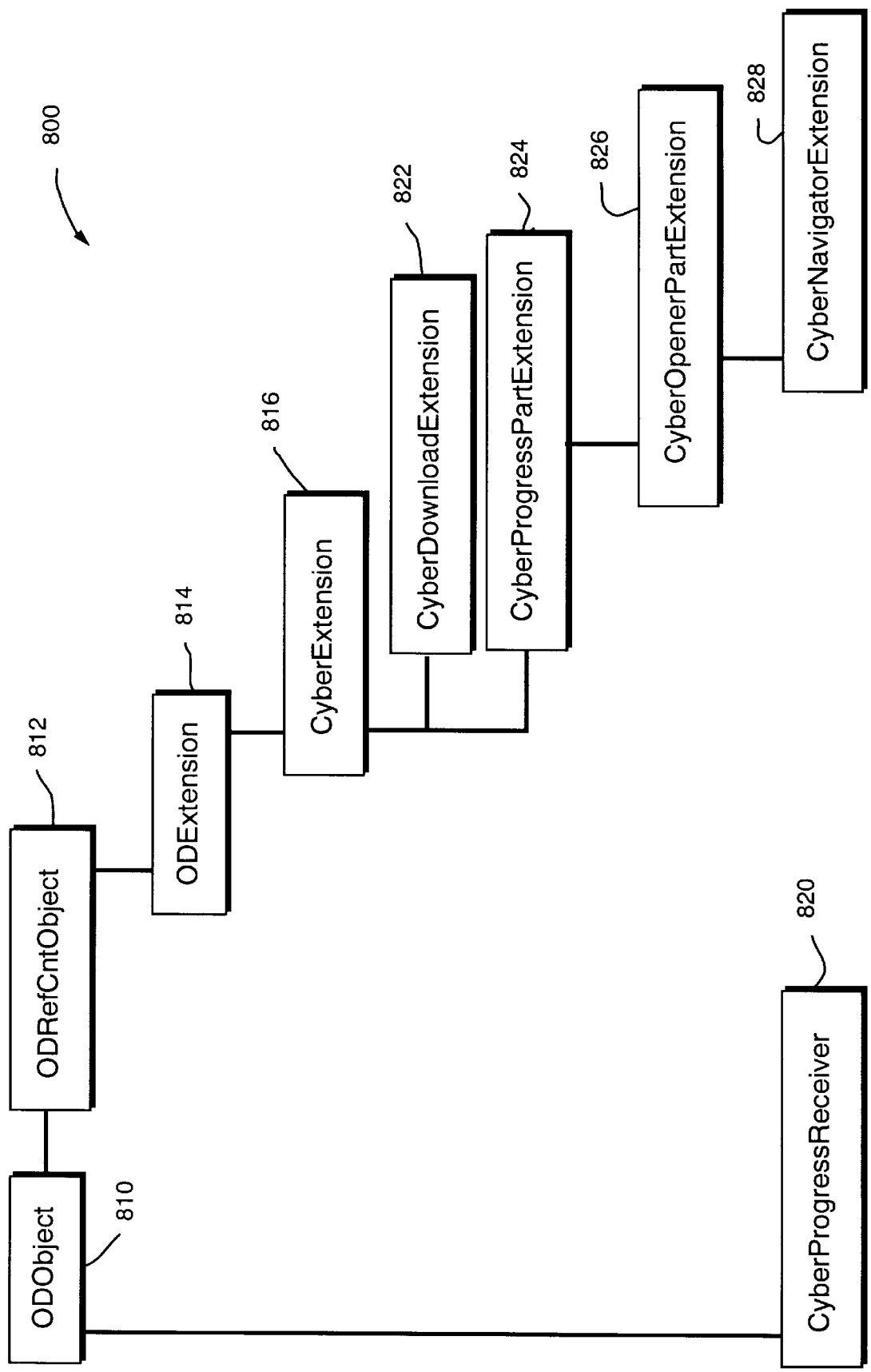
FIG. 9 illustrates a simplified class hierarchy diagram of classes and subclasses for creating supporting parts in accordance with the invention.

FIG. 9 illustrates a simplified class hierarchy diagram in accordance with the present invention. This illustration provides an example of classes that can be subclassed and implemented to replace supporting parts, such as the navigator, with custom parts. Class hierarchy 800 shows a base class ODObject 810 subclassed into ODRefCntObject class 812 and CyberProgressReceiver class 820. The ODRefCntObject class 812 is subclassed into ODExtension class 814 which is subclassed into CyberExtension class 816. The CyberExtension class 816 is subclassed into CyberDownloadExtension 822 and CyberProgressPartExtension class 824. The CyberProgressPartExtension class 824 is subclassed into CyberOpenerPartExtension class 826 and finally the CyberOpenerPartExtension class 826 is subclassed into CyberNavigatorExtension class 828.

To create a custom navigator part, the CyberNavigatorExtension class 828 must be subclassed and implemented. To create further custom parts in connection with the navigator part, the CyberProgressPartExtension class 824 and the CyberProgressReceiver class 820 can be used together to implement a progress part that monitors and displays the progress of any asynchronous process. Because the navigator and opening parts are both progress parts, they can both be used to display progress. To create a custom opening part, the CyberOpenerPartExtension class 826 must be subclassed and implemented and similarly, to create a custom download part, the CyberDownloadExtension class 822 must be subclassed and implemented. To display the progress of a process, a display part needs only to create a progress broadcaster, attach it to the progress part and call the broadcasters accessor methods to change its progress settings. In most cases, the progress part capabilities provided by the navigator part will be sufficient but the navigator part allows custom progress parts and progress receivers to be created.

For a more detailed discussion of the navigator part, the other parts, objects and processes associated with the novel navigator part and the classes and methods associated therewith, the text material *CyberDog Programmers Kit,* Apple Computer, Inc., July 1996 and *CyberDog,* Feiler, 1996, may be referred to and both texts are incorporated by reference as though fully set forth herein.

In summary, the novel network system described herein utilizes a "component based" approach to navigating between information locations of network oriented information. The advantages of utilizing the navigator part in such a component based system includes the ability to easily replace and extend components because of the cooperating relationship between the novel network oriented component system and the underlying component architecture. For instance, the kinds of information that can be embedded in the navigator part is open to extension so that third parties can create there own customized navigator parts. Also, this component based system facilitates "seamless" integration and cooperation between components and when confronted with different data types and formats by using the APIs bounding these components. The extensible and replaceable advantages provided by the novel network oriented component system presently cannot be realized by the monolithic application based approach of conventional systems.

While there has been shown and described an illustrative embodiment for implementing an extensible and replaceable asynchronous information opening component of a network component system, it is to be understood that various other adaptations and modifications may be made within the spirit and scope of the invention. For example, additional system software routines may be used when implementing the invention in various applications. These additional system routines include dynamic link libraries (DLL), which are program files containing collections of window environment and networking functions designed to perform specific classes of operations. These functions are invoked as needed by the software component layer to perform the desired operations. Specifically, DLLs, which are generally well-known, may be used to interact with the component layer and window manager to provide network-specific components and functions.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An extensible and replaceable layered component computing arrangement residing on a computer coupled to a computer network for navigating between information locations on the computer network, the layered arrangement comprising:

a component architecture layer interfacing with an operating system to control the operations of the computer, the component architecture layer defining a plurality of computing components;

a network component layer coupled to the component architecture layer in cooperating relation and comprising application programming interfaces delivered in the form of objects in a class hierarchy that include a CyberItem class for constructing a first network navigation object representing a network resource available at any location on the computer network; and a navigator component part for embedding information from the computer network therein and presenting the embedded information to a user.

2. The layered arrangement of claim 1 wherein the application programming interfaces further include a CyberStream class for constructing a second network navigation object representing a data stream for transferring information among objects of the arrangement.

3. The layered arrangement of claim 2 wherein the first network navigation object is a CyberItem object and the second network navigation object is a CyberStream object, and wherein the CyberItem object spawns the CyberStream object to obtain information from the network resource that the CyberItem object represents.

4. The layered arrangement of claim 2 wherein the application programming interfaces further include a CyberExtension class for constructing a third network navigation object representing additional behaviors provided to computing components of the component architecture layer to thereby enable communication between the computing components and the navigator component part.

5. The layered arrangement of claim 1 wherein the navigator component part presents information being processed in a display format including a progress and status display of the process.

6. The layered arrangement of claim 5 wherein the display format provides access to control functions, the control functions including forward and backward page controls, a pop up menu control for selecting from a visitation history, a stop control for stopping a process being performed, an editable URL location control, and an iconic representation control for a currently displayed page of information.

7. An extensible and replaceable layered component computing system for navigating between information available on computer networks, the computing system comprising:

a processor;

an operating system;

a component architecture layer interfacing with an operating system to control the operations of the computer, the component architecture layer defining a plurality of computing components;

a network component layer coupled to the component architecture layer in cooperating relation and comprising application programming interfaces delivered in the form of objects in a class heirarchy that includes a CyberItem class for constructing a first network navigation object representing a network resource available at any location on the computer netrwork; and a navigator component part for embedding information from the computer network therein and presenting the embedded information to a user.

8. The layered arrangement of claim 7 wherein the application programming interfaces further include a CyberStream class for constructing a second network navigation object representing a data stream for transfer ring information among objects of the arrangement.

9. The layered arrangement of claim 8 wherein the first network navigation object is a CyberItem object and the second network navigation object is a CyberStream object, and wherein the CyberItem object spawns the CyberStream object to obtain information from the network resource that the CyberItem object represents.

10. The layered arrangement of claim 8 wherein the application programming interfaces further include a CyberExtension class for constructing a third network navigation object representing additional behaviors provided to computing components of the component architecture layer to thereby enable communication between the computing components and the navigator component part.

11. The layered arrangement of claim 7 wherein the navigator component part presents information being processed in a display format including a progress and status display of the process.

12. The layered arrangement of claim 11 wherein the display format provides access to control functions, the control functions including forward and backward page controls, a pop up menu control for selecting from a visitation history, a stop control for stopping a process being performed, an editable URL location control, and an iconic representation control for a currently displayed page of information.

13. A method for navigating between information locations on a computer coupled to a computer, the method comprising the steps of:

interfacing a component architecture layer with an operating system to control the operations of the computer, the component architecture layer defining a plurality of computing components;

coupling a network component layer to the component architecture layer in cooperating relation, the network component layer comprising application programming interfaces delivered in the form of objects in a class hierarchy that include a CyberItem class for constructing a first network navigation object representing a network resource available at any location on the computer network; and embedding information from the computer network in a navigator component part and presenting the embedded information to a user.

14. A computer network having an extensible and replaceable layered component arrangement for navigating between information locations on the computer network, comprising:

means for interfacing a component architecture layer, which defines a plurality of computing components, with an operating system to control the operation of the computer;

means for coupling a network component layer to the component architecture layer in cooperating relation, the coupling means comprising application programming interfaces delivered in the form of objects in a class hierarchy that includes a CyberItem class for constructing a first network navigation object representing a network resource available at any location on the computer network; and navigating means for embedding information from the computer network therein and presenting the embedded information to a user.

15. The computer network of claim 14 wherein said navigating means includes display means for displaying progress and status of processes and presenting information processed in a display format.

16. A computer readable medium containing executable program instructions for an extensible and replaceable component program which navigates between information locations in a computer network, the executable program instructions comprising program instructions for:

(a) interfacing a component architecture layer, which defines a plurality of computing components, with an operating system to control the operations of the program;

(b) coupling a network component layer to the component architecture layer in cooperating relation, the network component layer comprising application programming interfaces delivered in the form of objects in a class hierarchy that includes a CyberItem class for constructing a first network navigation object representing a network resource available at any location on the computer network; and (c) embedding information from the computer network in a navigator component part for presenting the embedded information to a user.

17. The medium of claim 16 wherein the program instructions for embedding information comprises delivering application programming interfaces in the form of objects in a class hierarchy.

18. The medium of claim 16 wherein the program instructions for embedding information comprises presenting information processed in a display format including displaying progress and status.

19. An extensible and replaceable layered component computing arrangement residing on a computer coupled to a computer network for navigating between information locations on the computer network, the layered arrangement comprising:

a component architecture layer interfacing with an operating system to control the operations of the computer, the component architecture layer defining a plurality of computing components;

a network component layer coupled to the component architecture layer in cooperating relation and comprising application programming interfaces delivered in the form of objects in a class hierarchy that include an item class for constructing a first network navigation object representing a network resource available at any location on the computer network; and a navigator component part for embedding information from the computer network therein and presenting the embedded information to a user.

20. The layered arrangement of claim 19 wherein the application programming interfaces further include a stream class for constructing a second network navigation object representing a data stream for transferring information among objects of the arrangement.

21. The layered arrangement of claim 20 wherein the first network navigation object is an item object and the second network navigation object is a stream object, and wherein the item object spawns the stream object to obtain information from the network resource that the item object represents.

22. The layered arrangement of claim 20 wherein the application programming interfaces further include an extension class for constructing a third network navigation object representing additional behaviors provided to computing components of the component architecture layer to thereby enable communication between the computing components and the navigator component part.

23. The layered arrangement of claim 19 wherein the navigator component part presents information being processed in a display format including a progress and status display of the process.

24. The layered arrangement of claim 23 wherein the display format provides access to control functions, the control functions including forward and backward page controls, a pop up menu control for selecting from a visitation history, a stop control for stopping a process being performed, an editable URL location control, and an iconic representation control for a currently displayed page of information.

25. An extensible and replaceable layered component computing system for navigating between information available on computer networks, the computing system comprising:
   a processor;
   an operating system;
   a component architecture layer interfacing with an operating system to control the operations of the computer, the component architecture layer defining a plurality of computing components;
   a network component layer coupled to the component architecture layer in cooperating relation and comprising application programming interfaces delivered in the form of objects in a class hierarchy that include an item class for constructing a first network navigation object representing a network resource available at any location on the computer network; and
   a navigator component part for embedding information from the computer network therein and presenting the embedded information to a user.

26. The layered arrangement of claim 25 wherein the application programming interfaces further include a stream class for constructing a second network navigation object representing a data stream for transferring information among objects of the arrangement.

27. The layered arrangement of claim 26 wherein the first network navigation object is an item object and the second network navigation object is a stream object, and wherein the item object spawns the stream object to obtain information from the network resource that the item object represents.

28. The layered arrangement of claim 26 wherein the application programming interfaces further include an extension class for constructing a third network navigation object representing additional behaviors provided to computing components of the component architecture layer to thereby enable communication between the computing components and the navigator component part.

29. The layered arrangement of claim 25 wherein the navigator component part presents information being processed in a display format including a progress and status display of the process.

30. The layered arrangement of claim 29 wherein the display format provides access to control functions, the control functions including forward and backward page controls, a pop up menu control for selecting from a visitation history, a stop control for stopping a process being performed, an editable URL location control, and an iconic representation control for a currently displayed page of information.

31. A method for navigating between information locations on a computer network from a computer coupled to the network, the method comprising the steps of:
   providing the computer with a component architecture layer, an operating system, a network component layer and a navigator component part;
   interfacing the component architecture layer with the operating system to control the operations of the computer, the component architecture layer defining a plurality of computing components;
   coupling the network component layer to the component architecture layer in cooperating relation, the network component layer comprising application programming interfaces delivered in the form of objects in a class hierarchy that include an item class for constructing a first network navigation object representing a network resource available at any location on the computer network; and
   embedding information from the computer network in the navigator component part and presenting the embedded information to a user.

32. A computer capable of being coupled to a computer network, the computer having an extensible and replaceable layered component arrangement for navigating between information locations on the computer network, the computer comprising:
   means for interfacing a component architecture layer, which defines a plurality of computing components, with an operating system to control the operation of the computer;
   means for coupling a network component layer to the component architecture layer in cooperating relation, the coupling means comprising application programming interfaces delivered in the form of objects in a class hierarchy that include an item class for constructing a first network navigation object representing a network resource available at any location on the computer network; and
   navigating means for embedding information from the computer network therein and presenting the embedded information to a user.

33. A computer readable medium containing executable program instructions for an extensible and replaceable component program which navigates between information locations in a computer network, the executable program instructions comprising program instructions for:
   interfacing a component architecture layer, which defines a plurality of computing components, with an operating system to control the operations of the program;
   coupling a network component layer to the component architecture layer in cooperating relation, the network component layer comprising application programming interfaces delivered in the form of objects in a class hierarchy that includes an item class for constructing a first network navigation object representing a network resource available at any location on the computer network; and
   embedding information from the computer network in a navigator component part for presenting the embedded information to a user.

* * * * *